United States Patent
Yi et al.

(10) Patent No.: US 10,966,162 B2
(45) Date of Patent: Mar. 30, 2021

(54) METHOD AND APPARATUS FOR ADAPTING REPETITION LEVEL FOR UPLINK TRANSMISSION IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/569,744

(22) PCT Filed: May 10, 2016

(86) PCT No.: PCT/KR2016/004890
§ 371 (c)(1),
(2) Date: Oct. 26, 2017

(87) PCT Pub. No.: WO2016/182320
PCT Pub. Date: Nov. 17, 2016

(65) Prior Publication Data
US 2018/0146438 A1    May 24, 2018

Related U.S. Application Data

(60) Provisional application No. 62/159,343, filed on May 10, 2015, provisional application No. 62/161,264, filed on May 14, 2015.

(51) Int. Cl.
| | | |
|---|---|---|
| *H04W 52/26* | (2009.01) | |
| *H04W 52/14* | (2009.01) | |
| *H04W 52/22* | (2009.01) | |
| *H04W 52/24* | (2009.01) | |
| *H04W 52/32* | (2009.01) | |

(Continued)

(52) U.S. Cl.
CPC ............ *H04W 52/267* (2013.01); *H04L 1/18* (2013.01); *H04L 1/1812* (2013.01);
(Continued)

(58) Field of Classification Search
CPC ........ H04W 52/00–60; H04W 72/0413; H04L 1/18; H04L 1/1812
See application file for complete search history.

(56) References Cited

U.S. PATENT DOCUMENTS

| | | | |
|---|---|---|---|
| 2011/0080880 A1* | 4/2011 | Yin ...................... | H04B 7/0682 370/329 |
| 2013/0210500 A1* | 8/2013 | Graham ................ | H04W 52/30 455/571 |

(Continued)

FOREIGN PATENT DOCUMENTS

| | | |
|---|---|---|
| CN | 104521277 | 4/2015 |
| WO | 2015056946 | 4/2015 |

OTHER PUBLICATIONS

"Evaluation on PUCCH format transmission for UL-SCH" 3GPP TSG RAN WG1 Meeting #80bis , R1-151666 (Year: 2015).*
(Continued)

*Primary Examiner* — Raymond S Dean
(74) *Attorney, Agent, or Firm* — Lee Hong Degerman Kang & Waimey

(57) ABSTRACT

A method and apparatus for adapting a repetition level for uplink (UL) transmission in a wireless communication is provided. A user equipment (UE) configures different number of repetitions per physical uplink control channel (PUCCH) format, and transmits a PUCCH format by using a corresponding number of repetitions among the different number of repetitions.

18 Claims, 9 Drawing Sheets

(51) Int. Cl.
*H04L 1/18* (2006.01)
*H04W 72/04* (2009.01)
(52) U.S. Cl.
CPC ....... *H04W 52/146* (2013.01); *H04W 52/221* (2013.01); *H04W 52/24* (2013.01); *H04W 52/247* (2013.01); *H04W 52/248* (2013.01); *H04W 52/32* (2013.01); *H04W 52/325* (2013.01); *H04W 72/0413* (2013.01)

(56) References Cited

U.S. PATENT DOCUMENTS

| | | | |
|---|---|---|---|
| 2013/0217405 A1 | 8/2013 | Teixeira et al. | |
| 2013/0272258 A1* | 10/2013 | Lee ..................... | H04B 7/0413 370/329 |
| 2014/0036844 A1 | 2/2014 | Baldemair et al. | |
| 2014/0050185 A1* | 2/2014 | Hooli ................... | H04L 5/0053 370/329 |
| 2014/0133448 A1* | 5/2014 | Xu ...................... | H04W 52/146 370/329 |
| 2014/0233517 A1 | 8/2014 | Seo et al. | |
| 2015/0341921 A1* | 11/2015 | Chen ................. | H04W 72/0413 370/330 |
| 2016/0218788 A1* | 7/2016 | Yum ................... | H04B 7/0626 |
| 2016/0262182 A1 | 9/2016 | Yang et al. | |
| 2016/0353440 A1* | 12/2016 | Lee .......................... | H04W 4/70 |
| 2017/0094655 A1* | 3/2017 | Dai ........................... | H04L 5/14 |
| 2018/0069593 A1* | 3/2018 | Yi ........................... | H04B 1/713 |

OTHER PUBLICATIONS

LG Electronics, "PUCCH/PUSCH transmission for MTC UEs," 3GPP TSG-RAN WG1 #80, R1-150202, Feb. 2015, 11 pages.

Panasonic "Evaluation on PUCCH format transmission for UL-SCH," 3GPP TSG-RAN WG1 #80, R1-151666, Apr. 2015, 5 pages.

PCT International Application No. PCT/KR2016/004890, Written Opinion of the International Searching Authority dated Aug. 26, 2016, 35 pages.

Japan Patent Office Application No. 2017-557924, Office Action dated Sep. 25, 2018, 4 pages.

3rd Generation Partnership Project (3GPP), "Technical Specification Group Radio Access Network; Study on provision of low-cost Machine-Type Communications (MTC) User Equipments (UEs) based on LTE (Release 12)," 3GPP TR 36.888 V12.0.0, Jun. 2013, 55 pages.

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.5.0, Mar. 2015, 36 pages.

LG Electronics, "Power control for SR and ACK/NACK with PUCCH format 3", 3GPP TSG RAN WG1 Meeting #65, R1-111696, May 2011, 2 pages.

Chinese application No. 201680026511.8, Office Action dated Jun. 3, 2020, 7 pages.

Huawei et al., "Discussion on issues for PUCCH coverage improvement," 3GPP TSG RAN WG1 Meeting #76, R1-140029, Prague, Czech Republic, Feb. 10-14, 2014, 4 pages.

Ericsson, "PUCCH transmission for MTC," 3GPP TSG RAN WG1 Meeting #80b, R1-151217, Belgrade, Serbia, Apr. 20-24, 2015, 4 pages.

LG Electronics, "UL channel transmission for MTC coverage enhancement," 3GPP TSG RAN WG1 #76, R1-140308, Prague, Czech Republic, Feb. 10-14, 2014, 5 pages.

* cited by examiner

METHOD AND APPARATUS FOR ADAPTING REPETITION LEVEL FOR UPLINK TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2016/004890, filed on May 10, 2016, which claims the benefit of U.S. Provisional Application Nos. 62/159,343, filed on May 10, 2015 and 62/161,264, filed on May 14, 2015, the contents of which are all hereby incorporated by reference herein in their entirety.

BACKGROUND OF THE INVENTION

Field of the Invention

The present invention relates to wireless communications, and more particularly, to a method and apparatus for adapting a repetition level for uplink (UL) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

When coverage enhancement is configured for MTC UEs, various features may need to be adjusted according to coverage enhancement.

SUMMARY OF THE INVENTION

The present invention provides a method and apparatus for adapting a repetition level for uplink (UL) transmission in a wireless communication system. The present invention discusses technique(s) to handle/adapt repetition number for UL transmission which mainly focuses on a physical uplink control channel (PUCCH).

In an aspect, a method for transmitting, by a user equipment (UE), a physical uplink control channel (PUCCH) in a wireless communication system is provided. The method includes configuring different number of repetitions per PUCCH format, and transmitting a PUCCH format by using a corresponding number of repetitions among the different number of repetitions.

In another aspect, a method for resetting, by a user equipment (UE), a transmit power control (TPC) command in a wireless communication system is provided. The method includes receiving an accumulated TPC command from a network, and resetting the accumulated TPC command if a repetition number or a coverage enhancement (CE) level changes.

A repetition level for UL transmission, specifically for PUCCH, can be adapted appropriately.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
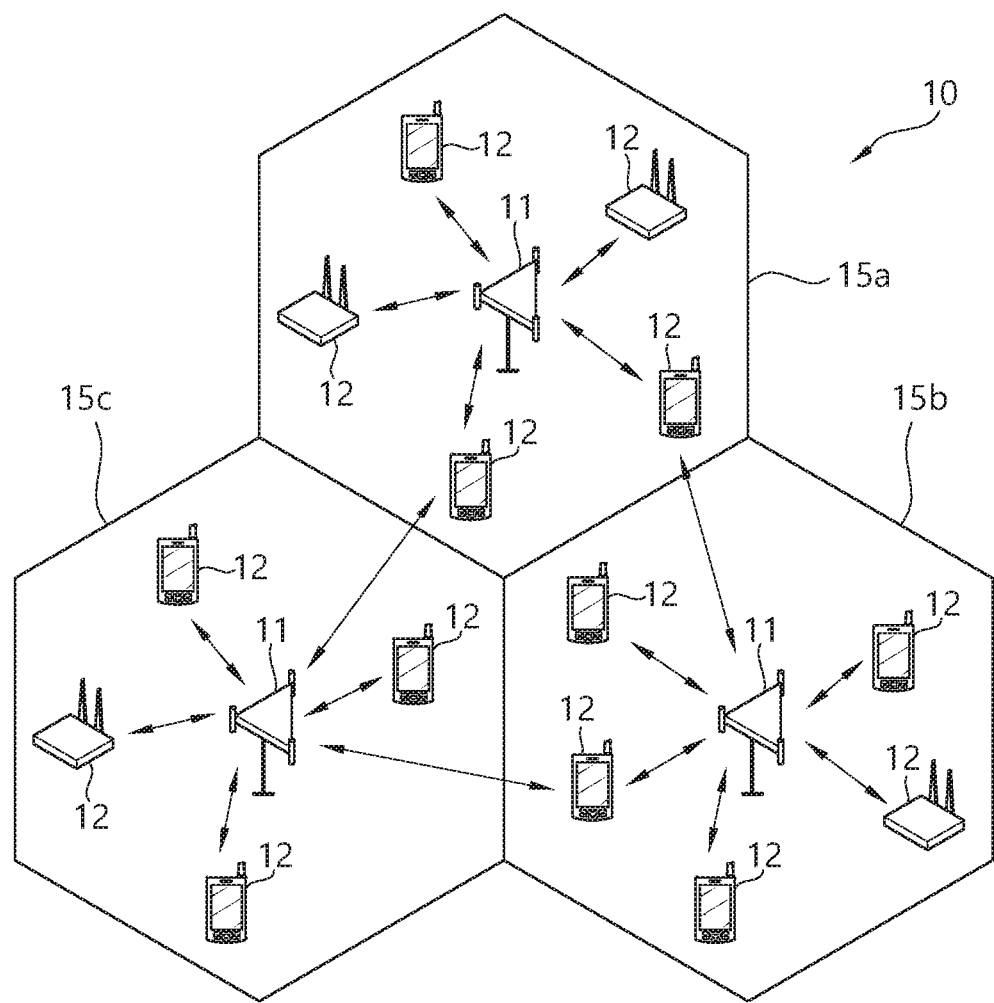
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
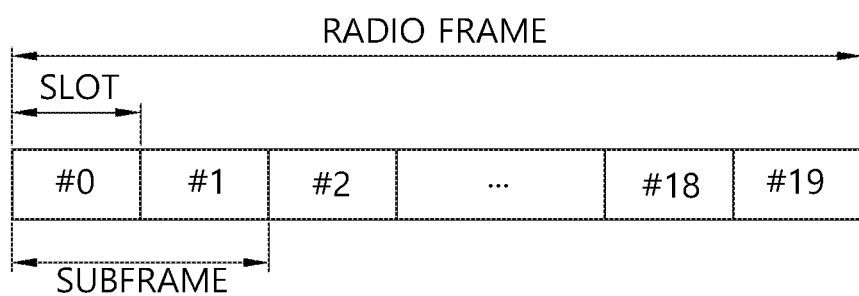
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
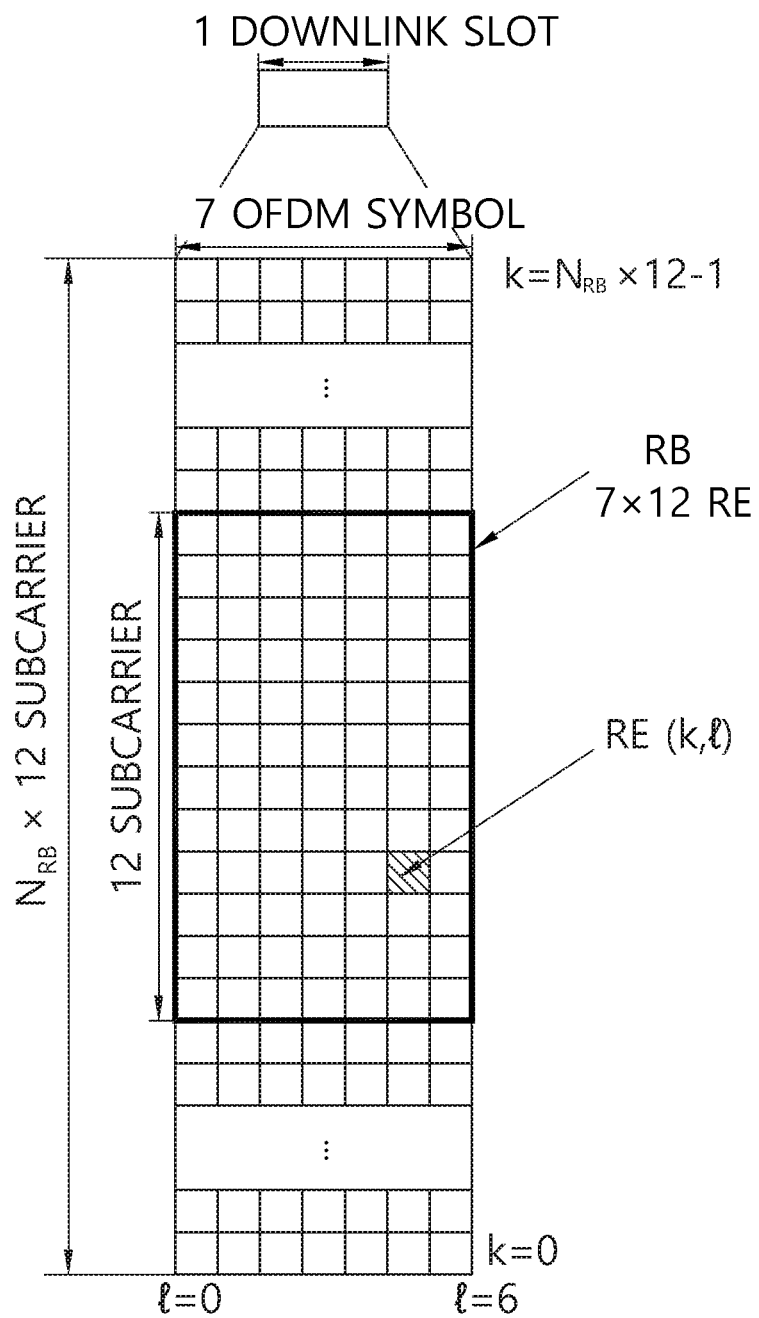
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
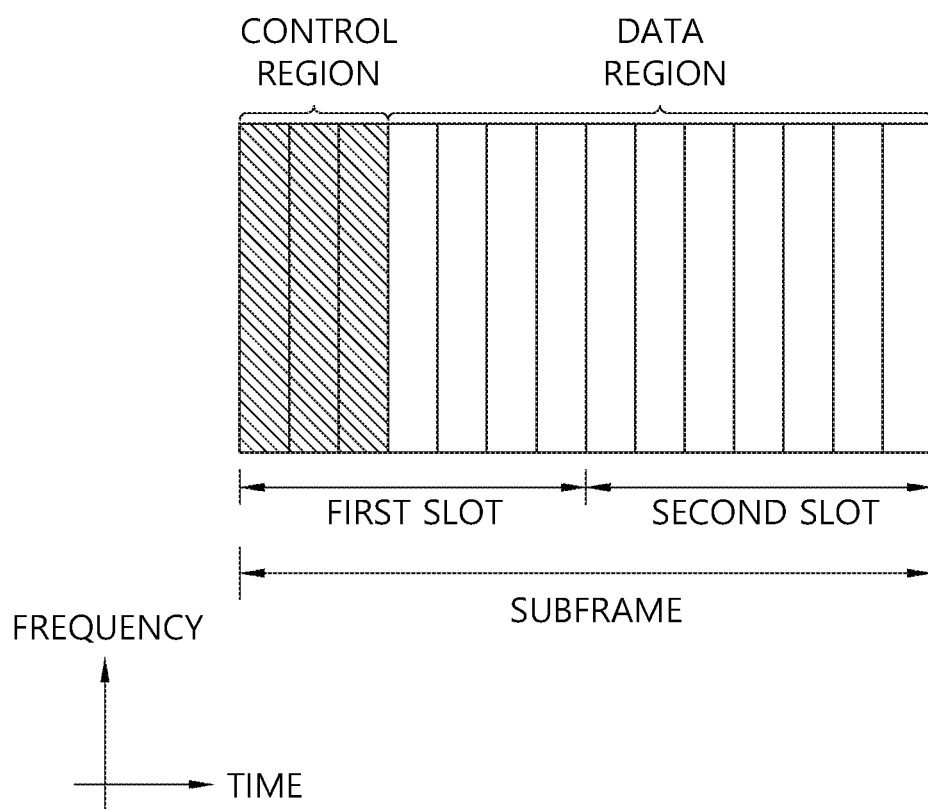
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel.

The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
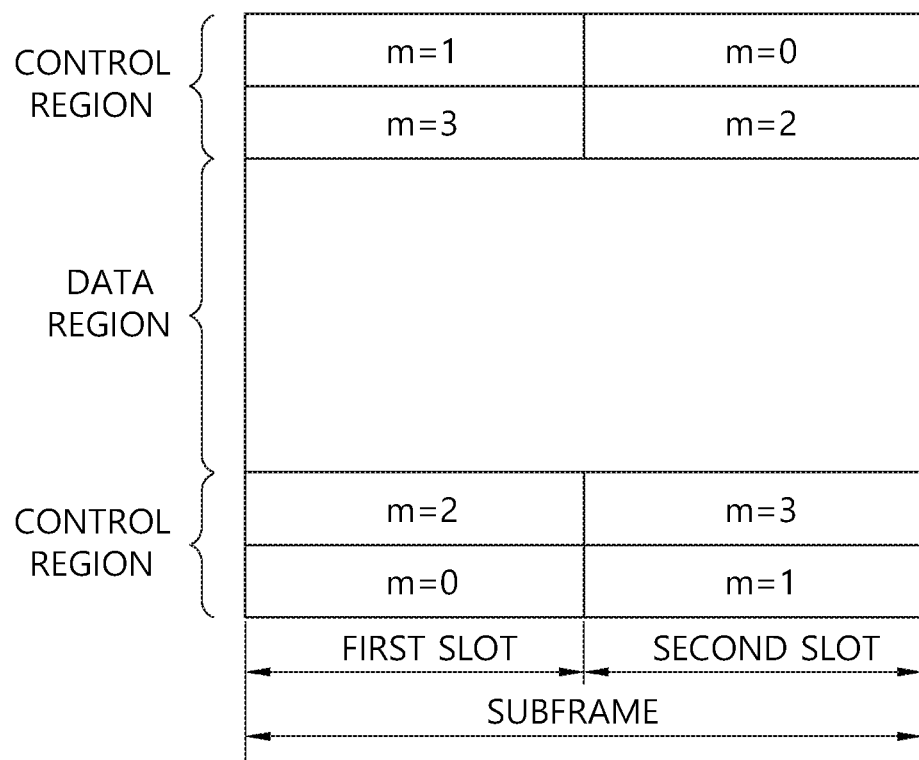
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ

ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Coverage enhancement (CE) for a machine-type communication (MTC) UE is described. When a UE performs initial access towards a specific cell, the UE may receive master information block (MIB), system information block (SIB) and/or radio resource control (RRC) parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

When a MTC UE having coverage issue uses the same service in the same cell with a legacy UE or a MTC UE not having coverage issue, a large amount of resources may be used to transmit data to the MTC UE having coverage issue. It may restrict services for other UEs. Therefore, in order to avoid the problem that an operation for the MTC UE having coverage issue may interference an operation for other UEs, a time region for the MTC UE having coverage issue and a time region for other UEs may be multiplexed by time division multiplexing (TDM). The time region for the MTC UE having coverage issue and time region for other UEs may be multiplexed with a long-term period, e.g. tens of minutes, or with a short-term period, e.g. some subframes.

In LTE-A, it has been discussed that repetition is applied to each channel for the MTC UE having coverage issue. That is, each channel may be transmitted with repetition for coverage enhancement of the MTC UE having coverage issue.

Further, it has been discussed that multiple subframe bundling of PDCCH/PDSCH is applied for the MTC UE having coverage issue. That is, the eNB may transmit PDCCH to the MTC UE having coverage issue by using N number of bundled subframes.

Figure 6:
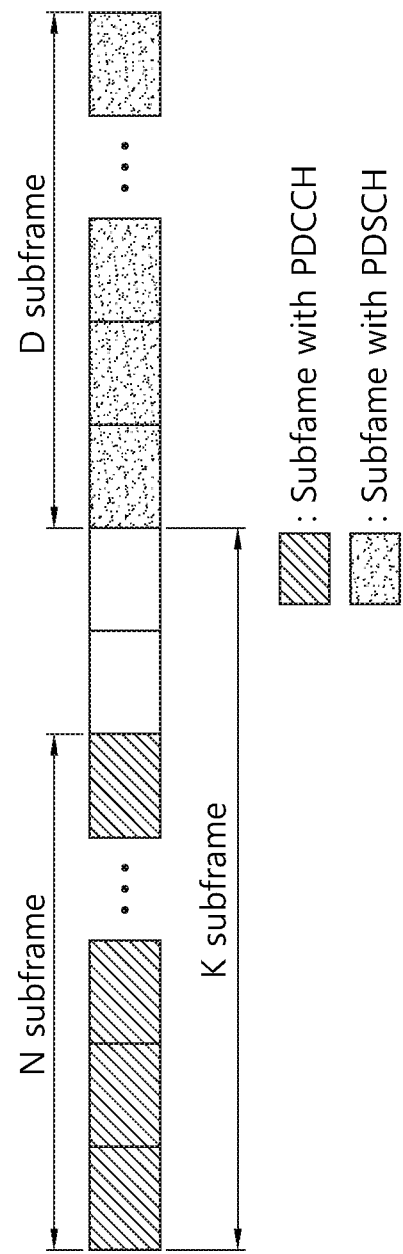
FIG. 6 shows an example of subframe bundling.

FIG. 6 shows an example of subframe bundling. Referring to FIG. 6, PDCCH is transmitted by using N subframes. PDSCH/PUSCH associated with PDCCH may be transmitted after G subframes from a subframe in which PDCCH transmission via N subframes is completed. Alternatively, PDSCH/PUSCH associated with PDCCH may be transmitted after K subframes from a subframe in which PDCCH transmission via N subframe starts.

A location of a subframe in which PDCCH transmission starts may not vary, and therefore, PDCCH may be transmitted from a pre-determined subframe. That is, a location of a subframe in which PDCCH transmission starts may be fixed. The fixed location of a subframe in which PDCCH transmission starts may be transmitted via MIB. For example, when it is determined that PDCCH transmission starts at a subframe of SFN % N=0 (e.g. N=20), N may be transmitted via MIB. Further, when it is determined that PDCCH transmission starts at a subframe of SFN % N=offset, offset may also be transmitted via MIB. For example, PDCCH transmission for the MTC UE having coverage issue may start at a subframe corresponding to multiple of 100 (e.g. 0, 100, 200, 300, . . . ). The MTC UE may attempt to receive PDCCH via N subframes from a subframe corresponding to multiple of 100. The location of the subframe where PDCCH transmission starts may be configured UE-specifically. In this case, the location of the subframe where PDCCH transmission starts may be configured via higher-layer signal e.g. RRC parameter.

Subframes in which PDCCH/PDSCH/PUSCH is transmitted may be consecutive or non-consecutive, respectively. However, it may be assumed that the MTC UE knows in which subframe bundled transmission is performed. Further, a number of subframes or repetition number for PDCCH/PDSCH/PUSCH transmission may be configured differently per CE level or may be pre-configured or may be transmitted via SIB or may be deduced by the UE.

Since the UL channel situation may be different from the DL channel situation, it may be inefficient that the UL repetition number depends on the DL repetition number. Accordingly, the repetition number for the UE may be configured differently for DL and UL, respectively. Accordingly, a method for adapting the repetition number, like power control, according to an embodiment of the present invention is proposed below.

Currently in 3GPP LTE, power control may be performed by the following operation.

Initial power setting: based on pathloss
Adaptive power increase/decrease via transmit power control (TPC) or absolute power setting via TPC
Different power offset per PUCCH format
Initial power setting per channel
Power headroom reporting (PHR)
Setting cell maximum UL power (or coverage)

When the UE is configured with CE, reducing power for transmission may mean that more subframes should be used for transmission. Accordingly, in perspective of UE which considers power consumption as important, it may be appropriate to use maximum transmission power. However, since UL coverage should be maintained, the maximum transmission power for the UE may be determined by min {PCmax, PEMAX,c}. When PCmax,C refers to a maximum value by considering the maximum transmission power and maximum power reduction (MPR), the transmission power of the UE may be determined by one of the following options.

(1) PCmax,c may always be used.
(2) Power adaptation may be feasible
2-1) (PCmax,c-Poffset) may always be used: Poffset may be configured UE-specifically by the network.
2-2) Power adaptation via power control mechanism similar to legacy procedure may be used. This option may be useful in case the network wants to have similar received power in the same resource. For example, if a UE with 15 dB CE enhancement and 0 dB CE enhancement share the same resource, and if the same power is used, the UE with 15 dB CE enhancement may suffer due to near-far effects. In this case, dynamic adaptation or option 2-1 may be further considered.

1. Repetition level adaption according to an embodiment of the present invention is described. The embodiment may be applied with option 1) or option 2-2) described above. Currently, LTE has the following power control mechanism for PUCCH power. If serving cell c is the primary cell, the setting of the UE transmit power $P_{PUCCH}$ for the PUCCH transmission in subframe i is defined by Equation 1.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} \quad \text{<Equation 1>}$$

[dBm]

In Equation 1, $P_{0\_PUCCH}+PL_c$ is used for open-loop power control which is to determine the required received power at the eNB. The network may handle the required received power at each resource. For a UE with CE, it is expected that $PL_c$ is very high, and thus, $P_{0\_PUCCH}+PL_c$ may become very high (close to configured UE maximum power or over configured UE maximum power). To mitigate this issue, CE level may be considered with one of the following approaches.

$P_{0\_PUCCH}$ may be lowered to accommodate 15 dB (or 18 dB) enhancement. The range of value may be changed to be lowered. If this is used, the network may suffer from low power transmission from UE in normal coverage as well. Thus, separate value of $P_{0\_PUCCH}$ may be configured per each CE level.

A UE with CE may also use $P_{0\_PUCCH}$ to derive transmission power. In most cases, this approach may produce the maximum transmission power. Since this power is based on PUCCH format 1a with PCmax,c=23 dBm, $P_{0\_PUCCH}$ may be used to derive the required number of repetition as well. For example, with PUCCH format 1a for a UE with PCmax,c=x dBm with assuming no MPR (this will also take into account of any power offset if configured by the network, or PEMAX), the offset may be computed by Equation 2 below.

$$P_{offset} = \max\{0, P_{0\_PUCCH}+PL_c-23\}+(23-X) \quad \text{<Equation 2>}$$

In Equation 2, the number of baseline repetition $R_{0\_PUCCH}$ may be represented as ceil $(10^{\wedge}(P_{offset}/10))$. In other words, to compensate the power required at the receiver side, repetitions may occur. In this way, $P_{0\_PUCCH}$ may be reused for a UE in CE mode. Now, $R_{0\_PUCCH}$ is computed, additional repetition may be needed to accommodate more bits or different PUCCH formats and also practical UE power due to MPR and so on. Then, $P_{offset}'$ may be computed by Equation 3 below.

$$P_{offset}' = \max\{0, P_{0\_PUCCH}+PL_c+h(n_{CQI}, n_{HARQ}, n_{SR})+ \\ \Delta_{F\_PUCCH}(F)+\Delta_{TXD}(F')+g(i)-23\}+(23-X') \quad \text{<Equation 3>}$$

In Equation 3, X' is the UE maximum power (PCmax, c) after computing MPR and so on. Since the MTC UE may not use more than one antenna for UL transmission, $\Delta_{TXD}(F')$ may be zero. Also, if closed loop power control is not used, g(i) may be set to zero as well. In other words, the repetition may be counted based on the required power with consideration of information bits and PUCCH format. The final repetition number of PUCCH may be computed as $(10^{\wedge}(P_{offset}'/10))$.

Alternatively, the value $P_{0\_PUCCH}$ may be configured such that it already capture 23 dBm value. Thus, $P_{offset}'$ may be computed by Equation 4 below.

$$P_{offset}' = \max\{0, P_{0\_PUCCH}+\delta PL_c+h(n_{CQI}, n_{HARQ}, \\ n_{SR})+\Delta_{F\_PUCCH}(F)+\Delta_{TXD}(F')+g(i)\}-X' \quad \text{<Equation 4>}$$

Since depending on the UE and network implementation, the aggregated PUCCH may not produce the required reception power (e.g. due to frequency error, estimation error, etc.). Thus, compensation parameter δ may be larger than 1. The compensation parameter δ may be added instead of multiplying to pathloss value. The compensation parameter δ may be configured by the network, or a default value for the compensation parameter δ may be signaled in SIB.

If this is used, the network may not know the number of repetitions that the UE has used for PUCCH transmission. Similar mechanism may also be used for PUSCH. To align the number, one mechanism may be to use $PL_c$ which has been reported to the network only and power control may not be used (i.e. g(i)=0). Also, some determination on $h(n_{CQI}, n_{HARQ}, n_{SR})$ may be necessary where the UE may not use the function. Instead, rather large offset value may be assigned per each PUCCH format regardless of information bits. Alternatively, the network may blindly search the number of repetition by utilizing the scrambling based on the end subframe or the number of repetition. However, this may increase the network complexity and may degrade the decoding probability/performance Also, X' value may need to be signaled, or the network may configure the maximum X' value considering possible MPR values occurred at the UE. The UE may use higher power than X' if configured, however, the repetition number may be defined by X'.

In summary, the number of repetitions may be computed such that it can satisfy the required reception power at the eNB side once the number of repetitions are aggregated. Further, similar to PUCCH, the number of repetitions may be determined for PUSCH based on the allocated resource.

2. Power level adaptation according to an embodiment of the present invention is described. The embodiment may be applied with option 2-2) described above. When code division multiplexing (CDM) among multiple UEs are applied, closed-loop power control may be important to result reasonable performance at the receiver side. Thus, TPC mechanism may be applied when a UE is in enhanced coverage. Before discussing the details of TPC mechanism, overall principles of UE UL power may be discussed in below.

For the discussion, it may be assumed that a channel is transmitted via m subframes utilizing repetition and bundling. It may be further assumed that m repetition may occur over M physical duration. M may refer duration between starting subframe and end subframe. Because there may be some subframes not usable for MTC UEs, M≥m. It may also be assumed that UL channel transmission may occur in different narrowband/frequency over time. In this case, frequency hopping may occur in every k subframe. It may also be assumed that frequency retuning gap, which is not zero, is used between frequency hopping. In this case, at least one of the following assumption may be considered.

(1) Assuming Pc_channel is the computed power for the channel transmission, it may be assumed that Pc_channel is constant across m subframes. However, a UE may use different power per subframe as it may transmit multiple channels at a subset of subframes. For example, during PUSCH transmission, sounding reference signal (SRS) repetition may occur intermittently. At least from the signal channel perspective, the constant power across m subframe may be assumed. To support this, a UE may compute the estimated power for m subframes in advance and take the minimum. In other words, Pc_channel=min{Pc_channel (i)} where i=0 . . . m-1.

(2) Constant power may be assumed over k subframes only. In other words, Pc_channel may be recomputed per k subframe where Pc_channel=min{Pc_channel (i)} where i=0 . . . k-1.

(3) The power may change per subframe basis. However, this may cause some issue in reception if the network may perform multiple subframe channel estimation based on the assumption of constant power usage.

Alternatively, the number of repetition used for UL transmission may be fixed and the UE may change the power depending on pathloss, number of ACK/NACK bits, payload size, the allocated number of RBs, etc. For example, a UE may be configured with a repetition level where the granularity of repetition level may be somewhat coarse (e.g. 5 dB range). Within each configured repetition level, the UE may adjust the maximum power either via TPC command or based on pathloss estimation.

For example, the required total power for PUCCH at i-th repetition of PUCCH may be computed by Equation 5 below.

$$P^{REQ}_{PUCCH}(i)=P_{0\_PUCCH}+PL_c+h(n_{CQI},\ n_{HARQ},\ n_{SR})+\Delta_{F\_PUCCH}(F)+\Delta_{TXD}(F')+g(i)$$ <Equation 5>

In each subframe j, the power of PUCCH may be computed by Equation 6 below.

$$P_{PUCCH}(j) = \min\left\{\begin{array}{l} PC\max, c(j) \\ P^{REQ}_{PUCCH}(i) - \beta * 10 * \log_{10}(RL) \end{array}\right\}$$ <Equation 6>

In Equation 6, RL is the configured number of repetition and β is used for implementation margin which may be configured by the network.

Similar mechanism may be used to determine power for scheduling request (SR) and SRS transmission. For the number of repetition, the number of repetition of SRS may follow the number of repetition configured for PUSCH (or PUCCH).

Alternatively, for the repetition number configured for PUCCH, the same repetition number may be applied for PUCCH transmission regardless of modulation and type. Also, the same repetition number may be applied for SR and SRS. In this case, the repetition number may be configured rather large to cover all PUCCH formats. However, this may be inefficient.

Or, different number of repetitions per PUCCH format may be configured. The actual number of repetitions per PUCCH format may be separately configured. Or, a ratio of the number of repetitions per PUCCH format, rather than the actual number of repetitions per PUCCH format, may be configured. Table 1 shows a ratio of the number of repetitions per PUCCH format. Based on the repetition number or CE level configured for PUCCH format 1, the repetition number or CE level for other PUCCH format may be computed. For example, if the actual number of repetitions for PUCCH format 1 is n, the actual number of repetitions for PUCCH format 2 is 10 n.

TABLE 1

| PUCCH format | Modulation scheme | Ratio of repetition |
| --- | --- | --- |
| 1 | N/A | 1 |
| 1a | BPSK | 2 |
| 1b | QPSK | 4 |
| 2 | QPSK | 10 |
| 2a | QPSK + BPSK | 10 |
| 2b | QPSK + QPSK | 15 |
| 3 | QPSK | 20 |

Assuming TPC mechanism is used for UEs in CE, the following issues may need to be clarified.

(1) How to accumulate power or apply power commanded by TPC: Currently TPC may be applied at n+4 subframe or n+k subframe, when TPC command is received at subframe n. This may occur in every subframe assuming no power change for a subframe where TPC command has not been received. For accumulated TPC, fc(i) may be updated as a*fc(i-k). For absolute TPC, fc(i) may be updated as fc(i-k). If this is strictly applied, the power may change in the middle of repeated transmission. If option 1) described above is used, TPC power may not be updated while the UE is transmitting repeated channel. To handle TPC command received during the repetition, one of the following options may be considered.

1) Update of fc(i) as fc(i-k) may be delayed until subframe 1 which is the first subframe after completing the current repetition. If another TPC has been received during the repetition or more than one TPC command has been received for the same channel, a UE may ignore previous TPC commands and take the last TPC command only.

2) Alternatively, Update of fc(i) as fc(i-k) may be applied and virtual power may be accumulated. While a UE is transmitting repeated channel, the UE may maintain a virtual power which may be accumulated based on TPC commands Once the repetition is completed, the total aggregated power aggregation_fc(i) may be applied to the power used for the repetition.

3) Alternatively, Option 3 Update of fc(i) as fc(i-k) may be applied in every subframe or in a unit of every L subframe, which may be configured by the network.

If option 2) is used, TPC power may not be updated within each k subframe. At each k-th subframe, the accumulated TPC may be reflected. Within k subframe, options described in the above may be applied.

In general, in terms of handling multiple TPC commands during repetition over L subframes, a UE may take only one TPC (e.g. the most recent) command or apply all commands using virtual power accumulation parameter. In this case, k subframes may not be so large where the possibility of receiving multiple TPC commands may be very low. Thus, taking the most recent TPC command may be sufficient.

In case of TPC update based on random access response (RAR, i.e. msg 2), the current procedure is as follows. If the UE receives the random access response message for a serving cell c, fc(0) may be determined by fc(0)= $\Delta P_{rampup,c} + \delta_{msg2,c}$. $\delta_{msg2,c}$ is the TPC command indicated in the random access response corresponding to the random access preamble transmitted in the serving cell c. $\Delta P_{rampup,c}$ may be determined by Equation 7 below.

$$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2) \cdot PL + \Delta_{TF,c}(0) \end{pmatrix}\right)\right\}, \Delta P_{rampuprequested,c}\right] \quad \langle\text{Equation 7}\rangle$$

In Equation 7, $\Delta P_{rampuprequested,c}$ may be provided by higher layers and corresponds to the total power ramp-up requested by higher layers from the first to the last preamble in the serving cell c. $M_{PUSCH,c}(0)$ is the bandwidth of the PUSCH resource assignment expressed in number of resource blocks valid for the subframe of first PUSCH transmission in the serving cell c. $D_{TF,c}(0)$ is the power adjustment of first PUSCH transmission in the serving cell c.

If power ramping is not used during PRACH transmission, $\Delta P_{rampuprequested,c}$ may be zero, and thus, $\Delta P_{rampup,c}$ may be zero. In other words, initial fc(0) may be set based on TPC command in RAR. Furthermore, if power ramping has not been used for PRACH, in terms of Msg3 transmission, the same power may be used (i.e. PCmax). The power may be reduced based on TPC commands afterwards. In other words, if power ramping has not been used for PRACH, the power setting for Msg3 may be fixed as the UE configured maximum power. In such a case, accumulated TPC may be applied by Equation 8 below.

$$P_{PUCCH\_new,c}(i) = \min\left\{\begin{array}{l} P_{CMAX,c}(i), \\ P_{PUCCH\_old,c}(j) + f_c(i) \end{array}\right\} \quad \langle\text{Equation 8}\rangle$$

In other words, the power may be accumulated only via TPC commands without relying on other signalling and pathloss measurement. In case absolute TPC command is transmitted, accumulated TPC may be applied by Equation 9 below.

$$P_{PUCCH\_new,c}(i) = \min\left\{\begin{array}{l} P_{CMAX,c}(i), \\ P_{CMAX,c}(j) + f_c(i) \end{array}\right\} \quad \langle\text{Equation 9}\rangle$$

In other words, the configured maximum power may be used for power accumulation.

If this procedure is used, the UE first may be configured with the configured maximum power and then the network may reduce the power via TPC commands This may be based on the assumption the scheduled number of RBs for PUSCH transmission may be maintained constantly. If the number of RBs may change, some parameter of number of RB may also be needed.

Similar mechanism may also be applied for PUCCH and SRS. In case of PUCCH transmission, different fc(i) value may need to be applied if PCmax is used for initial PUCCH transmission as well. Currently, it is expected that higher power may be used for more information bits. Thus, h(*) function in the power control may determine the power. If this is used, for the initial power, instead of applying PCmax,c for each PUCCH format, Equation 10 below may be applied.

$$P_{PUCCH}(i) = P_{CMAX,c}(i) - (\max\_h - h(n_{HARQ}, n_{SR})) \quad \langle\text{Equation 10}\rangle$$

In Equation 10, max_h may be configured by the network. In other words, PUCCH format 1, 1a/1b may start with some power offset. Since PUCCH format 3 may not be supported by the MTC UEs, max_h may be determined based on PUCCH format 2. In terms of computing the power for each PUCCH format, Equation 10 below may be used.

$$P_{PUCCH\_new,c}(i) = \\ \min\left\{\begin{array}{l} P_{CMAX,c}(i), \\ P_{CMAX,c}(j) + (\max\_h - h(n_{CQI}, n_{HARQ}, n_{SR})) + f_c(i) \end{array}\right\} \quad \langle\text{Equation 11}\rangle$$

Furthermore, the accumulated value may have different impact based on the repetition. Thus, in terms of TPC, the value may be applied per subframe or per repetition. If it is applied per repetition (in other words, the total received power may be increased/decreased to a certain number), repetition number needs to be considered in accumulation. Considering that the repetition number may be determined by the network, it is more straightforward to assume that TPC accumulation occurs per subframe.

When a UE is in CE mode, the pathloss value may be large. Thus, actual power after computing may always be near PCmax regardless of power accumulation if the original equation is used. As mentioned in the above, thus, in this case, some tailorization based on repetition level may be necessary.

2) In case of power computation, how to consider repetition number: If repetition number is used to compute the power level, repetition number may be scheduled via one of RRC, DCI, and PRACH CE level (implicitly determined based on CE level used by PRACH transmission). When repetition level is changed, the power per each subframe may change. In case a new repetition level is received during a channel repetition, similar to TPC update handling, restriction to apply the new power setting may be necessary depending on each option. If the repetition level may not be able to be changed during one channel repetition (i.e. it may be reflected only in the next channel repetition), then the power update based on repetition level may be updated only after the completion of one channel repetition. Otherwise, since the power may need to be maintained during at least k subframes, the repetition level update and power update may occur after the current k subframes are finished. In case of repetition level update, it may be updated in the next transmission if the first approach is used and it may be updated when the power is updated if the second approach is used. By adapting the repetition level during the repetition, a UE may be able to stop transmission of repetition in the middle. This may be applied when repetition level is updated by RRC message. If it is indicated by DCI, the repetition level may be reflected for the scheduled transmission and the power may be determined for the scheduled transmission.

When the mode of accumulated TPC command is configured, the UE may reset the received TPC (by setting f_c(i) or g_c(i) to zero) if the repetition number or the CE level of the channel/UE changes. This is because changing the repetition number or CE level means that the channel between the UE and the eNB has been changed substantially and the previously received TPC command which targeted the previous repetition number or CE level is not relevant anymore. Thus, it may be beneficial to restart accumulating TPC commands in the newly configured repetition number or CE level.

PHR according to an embodiment of the present invention is described. Power headroom may be reported where the difference between PUSCH power and PCmax,c can be reported similar to current PHR mechanism. In case the network receives negative PHR, the network may increase the repetition level configured to the UE. Since MTC UE may not transmit PUCCH and PUSCH simultaneously, type 2 PHR reporting may not be necessary. Meanwhile, in case TPC based power control is used, type 2 PHR may always be reported regardless of PUCCH/PUSCH simultaneous transmission configuration or supportability.

PHR computation for MTC UE may be as follows. If the UE transmits PUSCH without PUCCH in subframe i for serving cell c, power headroom for type 1 report may be computed by Equation 12.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i) - \beta^* 10^* \log_{10}(RL)\}$$ <Equation 12>

[dB]

In Equation 12, a UE may assume that $\beta = \alpha_c(j)$ for PUSCH power determination.

Considering CE, either PHR reporting values greater than the legacy such as larger negative values may be reported, or the configured repetition number may be considered in computation of PHR. For example, repetition factor may be subtracted by the overall pathloss based required power. In terms of repetition, the maximum repetition number may be used for PUSCH, and the configured repetition number may be used for PUCCH.

Repetition level adaptation/determination according to an embodiment of the present invention is described. For a UE in CE mode, adapting power may not be so essential, as it is more desirable to reduce the number of repetitions. Thus, utilizing TPC field or adaptation of repetition level may be alternatively considered. Hereinafter, a method for configuring/indicating a repetition level of PDSCH/PUSCH when (E)PDCCH is transmitted with repletion via multiple subframe for MTC UE in CE mode. Here, the repetition level may refer to repetition number (i.e. subframe number for repetition). Specifically, the repetition number may refer to a number of subframes used for actual repetition transmission. In some cases, a size of narrowband that the UE can monitor may be larger than a minimum unit (e.g. 6 PRBs). In this case, a number of repetitions may be vary according to scheduled RB. Generally, the number of repetitions may depend on MCS, a number of scheduled RBs, CE level of the UE, etc.

(1) Repetition level may be adapted via TPC commands/fields: Absolute repetition level or relative repetition level may be signalled via TPC commands or TPC fields in DCI. If relative repetition level is used, it may be relative against repetition level or total resource aggregation level (a combination of aggregation level and repetition level) used in EPDCCH (or MTC PDCCH (M-PDCCH)) transmission. For example, if CE level=3 is used for control channel transmission, CE level=2 may be used for PUSCH or PUCCH via signalling −1 in TPC field. Or, if absolute repetition level is used, repetition level of UL transmission may be determined regardless of DL repetition level. Or, for PUCCH/PUSCH transmission, repetition level signalled via DCI may be in effect immediately. In other words, corresponding PUCCH (for scheduled PDSCH) or scheduled PUSCH may use the configured repetition level by DCI. Or, if repetition level is configured by TPC commands, it may be effective in n+4 where n is the last subframe of TPC commands repetition.

(2) Repetition level may be adapted according to a value of total aggregated resource (TAR) of scheduling (E)PDCCH. That is, the repetition level of PDSCH/PUSCH, which is scheduled by (E)PDCCH, may be changed according to TAR value of the scheduling (E)PDCCH. Or, the repetition level of PDSCH/PUSCH may be changed according to TAR value of the most recently received (E)PDCCH. For example, when a specific UE receives (E)PDCCH scheduling PDSCH/PUSCH, the repetition level of PDSCH/PUSCH may be obtained from TAR value of the corresponding (E)PDCCH. Or, for semi-persistent scheduling (SPS) PDSCH, the repetition level of SPS PDSCH may follow the configured repetition level, or may be changed according to TAR value of the most recently scheduled (E)PDCCH.

The repetition level of PDSCH/PUSCH according to TAR value of the scheduling (E)PDCCH may be defined by equation for TAR value. For example, when a is a specific value, the repetition level of PDSCH may be determined as $\alpha^*$TAR. In this case, a may be determined according to MCS and the number of scheduled RBs. For example, when TAR value of EPDCCH indicates repetition across 10 subframes assuming 24 aggregation level (AL), PDSCH may be repeated across 100 subframes (i.e. repetition level) assuming MCS=5 and the number of scheduled RBs is 6. In this case, if MCS and/or the number of scheduled RB changes, the number of subframes for repetition may change. Or, If MCS and the number of scheduled RBs indicates a transport block size (TBS), a may change according to TBS.

Or, the repetition level of PDSCH/PUSCH according to TAR value of the scheduling (E)PDCCH may be predetermined according to TAR value or a range of TAR value of (E)PDCCH. For example, it may be defined that if TAR value of (E)PDCCH is 10~14, the repetition level of PDSCH/PUSCH의 repetition level may be 20, and if TAR value of (E)PDCCH is 15~20, the repetition level of PDSCH/PUSCH may be 40. If the UE receives TAR value of (E)PDCCH which is 18, the UE may know that the repetition level of the PDSCH to be received is 40. This value may change according to MCS, the number of scheduled RBs and/or TBS.

The repetition level of PDSCH/PUSCH according to TAR value of (E)PDCCH may be defined in the specification, or may be configured to the UE via SIB, RAR, or RRC signaling. Further, (E)PDCCH used for obtaining the repetition level of PDSCH/PUSCH may be restricted as (E)PDCCH with a specific DCI format.

Further, the relationship between repetition level of PDSCH/PUSCH, TBS, and the number of scheduled RBs may be configured by a fixed table. For example, Table 2 shows an example of the TBS table which represents the repetition level according to TBS index ($I_{TBS}$) and the number of scheduled RBs ($N_{PRB}$).

TABLE 2

| $I_{TBS}$ | \multicolumn{10}{c}{$N_{PRB}$} |
| --- | --- | --- | --- | --- | --- | --- | --- | --- | --- | --- |
| | 1 | 2 | 3 | 4 | 5 | 6 | 7 | 8 | 9 | 10 |
| 0 | | | | | | | | | | |
| 1 | | | | | | 16 | 32 | 56 | 88 | 120 |
| 2 | | | | | 16 | 32 | 56 | 88 | 120 | 152 |
| 3 | | | | 16 | 32 | 56 | 88 | 120 | 152 | 176 |
| 4 | | | 16 | 32 | 56 | 88 | 120 | 152 | 176 | 208 |
| 5 | | 16 | 32 | 56 | 88 | 120 | 152 | 176 | 208 | 224 |
| 6 | 16 | 32 | 56 | 88 | 120 | 152 | 176 | 208 | 224 | 256 |
| 7 | 24 | 56 | 88 | 144 | 176 | 208 | 224 | 256 | 328 | 344 |
| 8 | 32 | 72 | 144 | 176 | 208 | 256 | 296 | 328 | 376 | 424 |
| 9 | 40 | 104 | 176 | 208 | 256 | 328 | 392 | 440 | 504 | 568 |
| 10 | 56 | 120 | 208 | 256 | 328 | 408 | 488 | 552 | 632 | 696 |
| 11 | 72 | 144 | 224 | 328 | 424 | 504 | 600 | 680 | 776 | 872 |
| 12 | 328 | 176 | 256 | 392 | 504 | 600 | 712 | 808 | 936 | 1032 |
| 13 | 104 | 224 | 328 | 472 | 584 | 712 | 840 | 968 | 1096 | 1224 |
| 14 | 120 | 256 | 392 | 536 | 680 | 808 | 968 | 1096 | 1256 | 1384 |
| 15 | 136 | 296 | 456 | 616 | 776 | 936 | 1096 | 1256 | 1416 | 1544 |
| 16 | 144 | 328 | 504 | 680 | 872 | 1032 | 1224 | 1384 | 1544 | 1736 |
| 17 | 176 | 376 | 584 | 776 | 1000 | 1192 | 1384 | 1608 | 1800 | 2024 |
| 18 | 208 | 440 | 680 | 904 | 1128 | 1352 | 1608 | 1800 | 2024 | 2280 |
| 19 | 224 | 488 | 744 | 1000 | 1256 | 1544 | 1800 | 2024 | 2280 | 2536 |
| 20 | 256 | 552 | 840 | 1128 | 1416 | 1736 | 1992 | 2280 | 2600 | 2856 |
| 21 | 280 | 600 | 904 | 1224 | 1544 | 1800 | 2152 | 2472 | 2728 | 3112 |
| 22 | 328 | 632 | 968 | 1288 | 1608 | 1928 | 2280 | 2600 | 2984 | 3240 |
| 23 | 336 | 696 | 1064 | 1416 | 1800 | 2152 | 2536 | 2856 | 3240 | 3624 |
| 24 | 376 | 776 | 1160 | 1544 | 1992 | 2344 | 2792 | 3112 | 3624 | 4008 |
| 25 | 408 | 840 | 1288 | 1736 | 2152 | 2600 | 2984 | 3496 | 3880 | 4264 |
| 26 | 440 | 904 | 1384 | 1864 | 2344 | 2792 | 3240 | 3752 | 4136 | 4584 |

In Table 2, TBS index 0 from 5 may be assumed as new entries for repetition level from 1 to 6. In this case, the repetition level may be represented in the TBS table per each CE level as Table 3.

TABLE 3

| CE level | \multicolumn{10}{c}{TBS} |
| --- | --- | --- | --- | --- | --- | --- | --- | --- | --- | --- |
| | 16 | 32 | 56 | 88 | 120 | 152 | 176 | 208 | 224 | 256 |
| CE5 | | | | | | 384 | 448 | 502 | 566 | 640 |
| CE4 | | | | | | 192 | 224 | 256 | 288 | 320 |
| CE3 | | | | | 80 | 96 | 112 | 144 | 160 | 176 |
| CE2 | | | | 48 | 56 | 64 | 72 | 80 | 88 | 96 |
| CE1 | | 16 | 20 | 24 | 28 | 32 | 36 | 40 | 44 | |
| CE0 | 4 | 6 | 8 | 10 | 12 | 14 | 16 | 18 | 20 | |
| Normal | 1 | 1 | 1 | 1 | 1 | 1 | 2 | 3 | 4 | 5 |

For example, if the table is generated by 3 dB difference for each MCS, two times of resources may be needed to transmit the same RB. This may be increased or decreased by considering other elements. Since the TB increases by a value corresponding to one RB as each RB increases, the table may be generated by increasing a value corresponding to one RB. In other words, the table which can find the repetition level according to TBS may be configured. In this case, a value corresponding to CE level for TAR value of (E)PDCCH may be used. If MCS can represent CE level, and if the number of scheduled RBs is used, Table 4 may be used as an example.

TABLE 4

| $I_{TBS}$ | \multicolumn{10}{c}{$N_{PRB}$} |
| --- | --- | --- | --- | --- | --- | --- | --- | --- | --- | --- |
| | 1 | 2 | 3 | 4 | 5 | 6 | 7 | 8 | 9 | 10 |
| 0 | | | | | | 384 | 448 | 502 | 566 | 640 |
| 1 | | | | | | 192 | 224 | 256 | 288 | 320 |
| 2 | | | | | 80 | 96 | 112 | 144 | 160 | 176 |

TABLE 4-continued

| $I_{TBS}$ | \multicolumn{10}{c}{$N_{PRB}$} |
| --- | --- | --- | --- | --- | --- | --- | --- | --- | --- | --- |
| | 1 | 2 | 3 | 4 | 5 | 6 | 7 | 8 | 9 | 10 |
| 3 | | | | 48 | 56 | 64 | 72 | 80 | 88 | 96 |
| 4 | | | 16 | 20 | 24 | 28 | 32 | 36 | 40 | 44 |
| 5 | | 4 | 6 | 8 | 10 | 12 | 14 | 16 | 18 | 20 |
| 6 | 1 | 1 | 1 | 1 | 1 | 1 | 2 | 3 | 4 | 5 |

(3) Repetition level may be determined by DCI, and a value indicated by each index may change by a specific value. If MCS and the number of scheduled RBs are received via DCI, the repetition level may be determined by Table 4 described above. If CE level is received via DCI, the repetition level may be determined by Table 3 described above. Or, the repetition level according to the CE level may be explicitly configured as Table 5 below.

TABLE 5

| CE level | Repetition Number |
|---|---|
| 1 | 10 |
| 2 | 20 |
| 3 | 30 |
| 4 | 40 |
| 5 | 50 |
| 6 | 60 |
| 7 | 70 |

Or, if the UE is configured with CE level, the repetition level may be determined by multiplying each repetition number R with the CE level.

The method described above may be applied to both PDSCH and PUSCH. Or, Table applied to PDSCH and table applied to PUSCH may be configured separately. Or, the method may be applied differently for PDSCH and PUSCH. For example, the repetition level of PDSCH may be determined according to MCB and the number of scheduled RBs, while the repetition level of PUSCH may be indicated directly via DCI.

Or, the repetition level of PUSCH may be determined by Base_repetition *(repetition number indicated by EPDCCH or other means). In this case, the repetition number indicated by EPDCCH may be configured implicitly or explicitly, as described above. Base_repetition may be configured by the network for compensation of reduced power (relative to the maximum power) due to power restriction of the UE, power class, the maximum power configured by the network or MPR. Each value may be determined by UE capability, PEMAX, PHR (or MPR) reported by the UE. For example, for a UE with power reduction of 3 dB, Base_repetition may be determined as 2. Default_base_repetition should be configured during PRACH transmission, and this may be signaled via SIB. Further, this approach may be applied to the UE which uses repetition in UL but does not use repetition in DL.

More specifically, the repetition level of common control channel (e.g., paging, SIB, RAR) may be determined by any means. For example the repetition level of common control channel may be determined by the network via PBCH/SIB signaling. For SPS PDSCH, the repetition level may be determined as similar as the common control channel, or may be determined as the repetition level configured by SPS configuration, or may be determined by the most recently scheduled (E)PDCCH. For SPS PUSCH, the repetition level may be determined as the repetition level configured by SPS configuration, or may be determined by the most recently scheduled (E)PDCCH. Or, for SPS, the maximum repetition level configured by the network may always be supported.

In the description above, the present invention was described by using an example of PUSCH for the convenience. However, the present invention described above may also be applicable to DL transmission such as PDSCH to determine repetition level.

Figure 7:
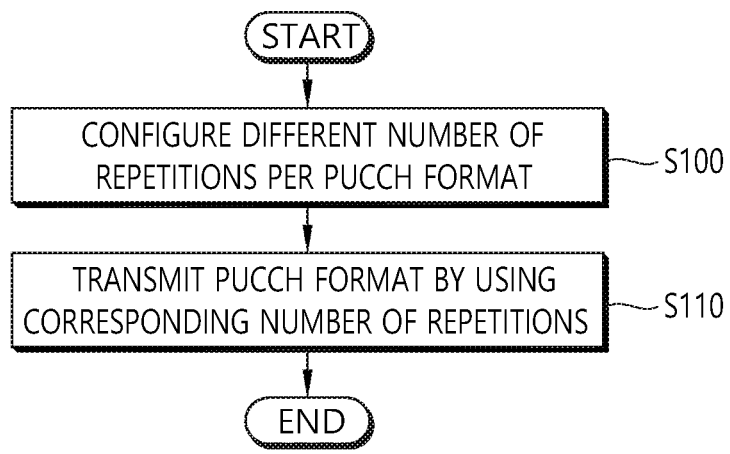
FIG. 7 shows a method for transmitting, by a UE, a PUCCH according to an embodiment of the present invention.

FIG. 7 shows a method for transmitting, by a UE, a PUCCH according to an embodiment of the present invention.

In step S100, the UE configures different number of repetitions per PUCCH format.

In step S110, the UE transmits a PUCCH format by using a corresponding number of repetitions among the different number of repetitions. The different number of repetitions per PUCCH format may be separately configured by actual number of repetitions per PUCCH format. Alternatively, the different number of repetitions per PUCCH format may be configured by a ratio with a number of repetitions for PUCCH format 1. In this case, the ratio with the number of repetitions for PUCCH format 1 may increase as a number of bits corresponding to each PUCCH format increases. A transmission power for the PUCCH format may change according to at least one of a pathloss, a number of bits transmitted via the PUCCH format, a payload size, an allocated number of resource blocks.

Further, the UE may compute a power for transmitting the PUCCH format. The power for transmitting the PUCCH format may be constant across m subframes. The power for transmitting the PUCCH format may be a minimum power of estimated power across m subframes.

Figure 8:
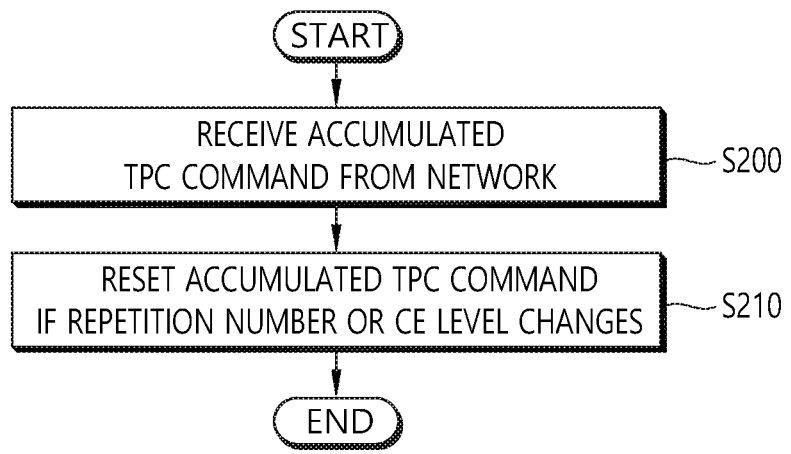
FIG. 8 shows a method for resetting, by a UE, a TPC command according to an embodiment of the present invention.

FIG. 8 shows a method for resetting, by a UE, a TPC command according to an embodiment of the present invention.

In step S200, the UE receives an accumulated TPC command from a network. In step S210, the UE resets the accumulated TPC command if a repetition number or a CE level changes. The repetition number or the CE level may change during repetition. The accumulated TPC command may be reset by setting $f_c(i)$ to 0. The repetition number may be used to control a transmission power. The repetition number may be configured via RRC parameter, DCI, or PRACH CE level.

Figure 9:
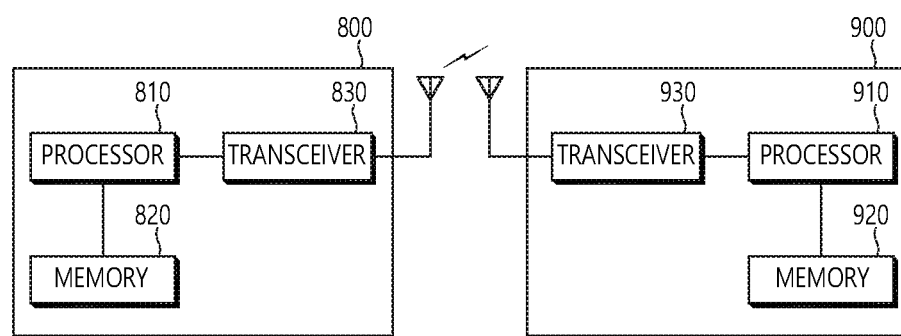
FIG. 9 shows a wireless communication system to implement an embodiment of the present invention.

FIG. 9 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), a physical uplink control channel (PUCCH) signal in a wireless communication system, the method comprising:
configuring a first number of repetitions for a first PUCCH format, wherein the first PUCCH format is PUCCH format 1;
configuring a second number of repetitions for a second PUCCH format, wherein the second PUCCH format is PUCCH format 2a or PUCCH format 2b,
wherein the first number of repetitions and the second number of repetitions are configured based on a coverage enhancement level, Modulation Coding Scheme (MCS) and a number of Resource Blocks (RBs) scheduled for the PUCCH signal,
wherein the second number of repetitions is configured to be equal to a number which is ten times the first number of repetitions, based on that the second PUCCH format is PUCCH format 2a, and
wherein the second number of repetitions is configured to be equal to a number which is fifteen times the first number of repetitions, based on that the second PUCCH format is PUCCH format 2b;
determining transmission power for the PUCCH signal, based on an accumulated TPC command information; and
transmitting the PUCCH signal, which is repeated over a plurality of subframes, based on the first PUCCH format by the first number of repetitions or based on the second PUCCH format by the second number of repetitions,
wherein when a plurality of TPC command information is received while the PUCCH signal is being repeatedly transmitted over the plurality of subframes, a last TPC command information among the plurality of TPC command information is used for the accumulated TPC command information to determine transmission power for next transmission of the PUCCH signal and other TPC command information is ignored, and
wherein the accumulated TPC command information is reset, when the coverage enhancement level changes.

2. The method of claim 1, wherein the first number of repetitions and the second number of repetitions are separately configured.

3. The method of claim 1, wherein the first number of repetitions and the second number of repetitions are configured by a ratio with a number of repetitions for the PUCCH format 1.

4. The method of claim 3, wherein the ratio of the number of repetitions for PUCCH format 1 increases as a number of bits of each of the first PUCCH format and the second PUCCH format increases.

5. The method of claim 1, wherein the transmission power for the PUCCH signal changes based on at least a pathloss, a number of bits transmitted via the first PUCCH format or the second PUCCH format, a payload size, or an allocated number of resource blocks.

6. The method of claim 1, further comprising computing the transmission power for transmitting the PUCCH signal.

7. The method of claim 6, wherein the computed transmission power is constant across m number of subframes.

8. The method of claim 7, wherein the computed transmission power is a minimum estimated power across the m number of subframes.

9. A user equipment (UE) transmitting a physical uplink control channel (PUCCH) signal in a wireless communication system, the UE comprising:
a memory configured to store information;
a transceiver configured to transmit and receive information; and
a processor operably coupled to the memory and the transceiver and configured to:
configure a first number of repetitions for a first PUCCH format, wherein the first PUCCH format is PUCCH format 1;
configure a second number of repetitions for a second PUCCH format, wherein the second PUCCH format is PUCCH format 2a or PUCCH format 2b,
wherein the first number of repetitions and the second number of repetitions are configured based on a coverage enhancement level, Modulation Coding Scheme (MCS) and a number of Resource Blocks (RBs) scheduled for the PUCCH signal,
wherein the second number of repetitions is configured to be equal to a number which is ten times the first number of repetitions, based on that the second PUCCH format is PUCCH format 2a, and
wherein the second number of repetitions is configured to be equal to a number which is fifteen times the first number of repetitions, based on that the second PUCCH format is PUCCH format 2b;
determine transmission power for the PUCCH signal, based on an accumulated TPC command information; and
control the transceiver to transmit the PUCCH signal, which is repeated over a plurality of subframes based on the first PUCCH format by the first number of repetitions or based on the second PUCCH format by the second number of repetitions,
wherein when a plurality of TPC command information is received while the PUCCH signal is being repeatedly transmitted over the plurality of subframes, a last TPC command information among the plurality of TPC command information is used for the accumulated TPC command information to determine transmission power for next transmission of the PUCCH signal and other TPC command information is ignored, and
wherein the accumulated TPC command information is reset, when the coverage enhancement level changes.

10. The UE of claim 9, wherein the first number of repetitions and the second number of repetitions are separately configured.

11. The UE of claim 9, wherein the first number of repetitions and the second number of repetitions are configured by a ratio with a number of repetitions for the PUCCH format 1.

12. The UE of claim 11, wherein the ratio of the number of repetitions for the PUCCH format 1 increases as a number of bits of each of the first PUCCH format and the second PUCCH format increases.

13. The UE of claim 9, wherein the transmission power for the PUCCH signal changes based on at least a pathloss, a number of bits transmitted via the first PUCCH format or the second PUCCH format, a payload size, or an allocated number of resource blocks.

14. The UE of claim 9, wherein the processor is further configured to compute the transmission power for transmitting the PUCCH signal.

15. The UE of claim 14, wherein the computed transmission power is constant across m number of subframes.

16. The UE of claim 15, wherein the computed transmission power is a minimum estimated power across the m number of subframes.

17. The UE of claim 9, wherein the second transmission power is maximum output power.

18. The method of claim 1, wherein the second transmission power is maximum output power.

* * * * *